US012510536B2

(12) United States Patent
Miyake et al.

(10) Patent No.: US 12,510,536 B2
(45) Date of Patent: Dec. 30, 2025

(54) METHOD FOR CHANGING CONDITION OF EYELID OF HAIRLESS ANIMAL

(71) Applicant: SANTEN PHARMACEUTICAL CO., LTD., Osaka (JP)

(72) Inventors: Hideki Miyake, Ikoma (JP); Tomoko Oda, Ikoma (JP)

(73) Assignee: SANTEN PHARMACEUTICAL CO., LTD., Osaka (JP)

( * ) Notice: Subject to any disclaimer, the term of this patent is extended or adjusted under 35 U.S.C. 154(b) by 1333 days.

(21) Appl. No.: 17/034,009

(22) Filed: Sep. 28, 2020

(65) Prior Publication Data
US 2021/0011004 A1    Jan. 14, 2021

Related U.S. Application Data

(62) Division of application No. 15/964,210, filed on Apr. 27, 2018, now abandoned, which is a division of application No. 14/401,858, filed as application No. PCT/JP2013/066702 on Jun. 18, 2013, now abandoned.

(30) Foreign Application Priority Data

Jun. 19, 2012  (JP) .................... 2012-137778

(51) Int. Cl.
G01N 33/50    (2006.01)
A01K 67/027   (2006.01)
A61K 31/7052  (2006.01)
A61K 45/00    (2006.01)

(52) U.S. Cl.
CPC ....... *G01N 33/5088* (2013.01); *A01K 67/027* (2013.01); *A61K 31/7052* (2013.01); *A61K 45/00* (2013.01); *G01N 33/5082* (2013.01); *A01K 2207/25* (2013.01); *A01K 2227/105* (2013.01); *A01K 2267/035* (2013.01); *G01N 2500/10* (2013.01); *G01N 2800/162* (2013.01)

(58) Field of Classification Search
None
See application file for complete search history.

(56) References Cited

U.S. PATENT DOCUMENTS

| | | | |
|---|---|---|---|
| 6,316,691 B1 | 11/2001 | Kondo et al. | |
| 6,432,934 B1 | 8/2002 | Gilbard | |
| 6,506,412 B2 | 1/2003 | Troyer et al. | |
| 7,029,712 B1 | 4/2006 | Thornton et al. | |
| 9,115,078 B2 | 8/2015 | Smith et al. | |
| 9,381,183 B2 | 7/2016 | Smith et al. | |
| 2010/0022465 A1 | 1/2010 | Brubaker et al. | |
| 2015/0125394 A1 | 5/2015 | Miyake et al. | |
| 2015/0245994 A1* | 9/2015 | Kido | A61K 47/38 514/29 |
| 2018/0246081 A1 | 8/2018 | Miyake et al. | |

FOREIGN PATENT DOCUMENTS

| | | |
|---|---|---|
| JP | 2002-335813 A | 11/2002 |
| JP | 2003-523925 A | 8/2003 |
| JP | 2004-132794 A | 4/2004 |
| JP | 2011-527709 A | 11/2011 |
| WO | 98/05202 A1 | 2/1998 |
| WO | 00/07601 A1 | 2/2000 |
| WO | 2007/058383 A2 | 5/2007 |
| WO | 2010/006306 A1 | 1/2010 |

OTHER PUBLICATIONS

Kligman and Kligman (The Journal of Investigative Dermatology 73:354-358, 1978) (Year: 1978).*
Jester et al. IOVS 29(7):1190-1194, 1988 (Year: 1988).*
Miyake et al (IOVS 2016 57:3268-3275 (Year: 2016).*
Tong and Gupta (Ophthalmol Ther DOI 10. 1007/s40123-016-0070-6. 2016 pp. 1-6) (Year: 2016).*
Ikarashi et al (Evidence-based Complementary and Alternative Medicine Jan. 2012(1):120389 DOI:10.1155/2012/120389. pp. 1-9 (Year: 2012).*
Riken BRC (Nov. 2011 Hairless Congenics for Dermatology Studies | Experimental Animal Division (RIKEN BRC) https://mus.brc.riken.jp/en/mouse_of_month/nov_2011_mm#:~:text=To utilize the hairless characteristics,useful for various dermatological studies. &tex . . . pp. 1-3) (Year: 2011).*
Davisson (National Research Council (US) International Committee of the Institute for Laboratory Animal Research. Microbial and Phenotypic Definition of Rats and Mice: Proceedings of the 1998 US/Japan Conference. Washington (DC): National Academies Press (US); 1999. pp. 1-6) (Year: 1997).*
Jackson Laboratory (Blog Post. Aug. 2016 https://www.jax.org/news-and-insights/jax-blog/2016/august/maybe-its-not-you.pp. pp. 1-5) (Year: 2016).*
International Search Report (PCT/ISA/210) mailed on Jul. 30, 2013, by the Japanese Patent Office as the International Searching Authority for International Application No. PCT/JP2013/066702.
Harauma et al.: "N-3-Kei Shibosan Ketsubo Mouse o Mochiita Dry Eye Ni Kansuru Kento", (O-15 Study of Dry Eye Using n-3 Fatty Acid Deficient Mice), Journal of Lipid Nutrition, 2011, vol. 20, No. 2, p. 145.
Fujii et al.: "Atopic dermatitis-like pruritic skin inflammation caused by feeding a special diet to HR-1 hairless mice", Experimental Dermatology, 2005, vol. 14, No. 6, pp. 460-468.

(Continued)

*Primary Examiner* — Marcia S Noble
(74) *Attorney, Agent, or Firm* — BUCHANAN INGERSOLL & ROONEY PC

(57) ABSTRACT

A method for changing a condition of an eyelid of a hairless animal, a model animal for evaluating a therapeutic or prophylactic effect against an eyelid disease obtained by the method, a method for producing the model animal, a method of screening using the model animal and a substance having a therapeutic or prophylactic effect against an eyelid disease selected by the method of screening, and a therapeutic or prophylactic agent against an eyelid disease containing the substance as an active ingredient.

4 Claims, No Drawings

(56) References Cited

OTHER PUBLICATIONS

Kenchegowda et al.: "Conditional disruption of mouse Klf5 results in defective eyelids with malformed meibomian glands, abnormal cornea and loss of conjuctival goblet cells", Developmental Biology, 2011, vol. 356, No. 1, pp. 5-18.
Communication pursuant to Rule 164(1) EPC, partial supplementary search report issued on Dec. 7, 2015, by the European Patent Office in corresponding European Patent Application No. 13806586.7-1464.
Arciniega et al.: "Effects of Calcium and Magnesium on Meibomian Lipid Films In the Presence and Absence of Oleic Acid", Arvo Annual Meeting Abstract Search and Program Planner, vol. 2011, May 2011, p. 3729, XP009187431.
Extended Search Report issued on Mar. 10, 2016, by the European Patent Office in corresponding European Patent Application No. 13806586.7-1466.
Torkildsen et al.: "Evaluation of clinical efficacy and safety of tobramycin/dexamethasone ophthalmic suspension 0.3% /0.05% compared to azithromycin ophthalmic solution 1% in the treatment of moderate to severe acute blepharitis/blepharoconjunctivitis", Current Medical Research and Opinion, vol. 27, No. 1, Jan. 1, 2011, pp. 171-178.
Notice of Grounds of Rejection issued on Jan. 31, 2017, by the Japanese Patent Office in corresponding Japanese Patent Application No. 2013-127455.
Normal History of the Eyelid Normal Histology of the Eyelid, downloaded at: https://image.slidesharecdn.com/sccbccsgcrecovered-140918060648-phpapp01/95/squamous-cell-carcinoma-basal-cell-carcinoma-sebaceous-gland-carcinoma-4-638.jpg?cb=1411020519, Aug. 4, 2017.
Pinna et al.: "Effect of Oral Linoleic and $\gamma$-Linolenic Acid on Meibomian Gland Dysfunction", Cornea 2007; 26: 260-264.
Tsuji et al.: Dietary glucosylceramide improves skin barrier function in hairless mice, Journal of Dermatological Science (2006) 44, 101-107.
Decision to Grant Patent issued on Mar. 13, 2018, by the Japanese Patent Office in corresponding Japanese Patent Application No. 2013-127455, and a partial English translation of the Decision. (5 pages).
Communication pursuant to Article 94(3) EPC issued on Apr. 6, 2018, by the European Patent Office in corresponding European Patent Application No. 13806586.7-1112. (7 pages).
Tong et al.: "Need for Animal Models of Meibomian Gland Dysfunction", Ophthalmol Ther (2016) 5:129-134, XP55456768 (6 pages).
Ikarashi et al., "Inhibitory Effect of Polyphenol-Rich Fraction from the Bark of Acacia Mearnsii on Itching Associated with Allergic Dermatitis", Evidence-Based Complementary and Alternative Medicine, 2012, vol. 2012, Article ID 120389. (9 pages).
Ishina et al., "Latent Essential Fatty Acid Deficiency in a Special Diet Deteriorates Skin Barrier", Osaka City Med. J., 2009, vol. 54, pp. 63-74.

\* cited by examiner

METHOD FOR CHANGING CONDITION OF EYELID OF HAIRLESS ANIMAL

RELATED APPLICATIONS

This application is a Divisional of U.S. patent application Ser. No. 15/964,210, filed on Apr. 27, 2018, which is a Divisional of U.S. application Ser. No. 14/401,858, filed on Nov. 18, 2014, now abandoned, which is a U.S. National Stage of International Application No. PCT/JP2013/066702, filed on Jun. 18, 2013, which in turn claims priority to Japanese Application No. 2012-137778, filed on Jun. 19, 2012, the entire content of each of which is incorporated herein by reference.

TECHNICAL FIELD

The present invention relates to a method for changing a condition of an eyelid of a hairless animal, a model animal for evaluating a therapeutic or prophylactic effect against an eyelid disease obtained by the method, a method for producing the model animal, a method of screening using the model animal and a substance having a therapeutic or prophylactic effect against an eyelid disease selected by the method of screening, and a therapeutic or prophylactic agent against an eyelid disease containing the substance as an active ingredient.

BACKGROUND ART

Meibomian glands, located in the tarsal plate, are sebaceous glands with orifices on the upper and lower lid margins. Lipids secreted from the meibomian glands are distributed over the lid margins and the outermost layer of tears, and serve to inhibit evaporation of the tears, promote tear stability, promote the spread of tears over the ocular surface, and inhibit the flow of tears on the lid margins out to the skin, for example. Abnormal functioning of meibomian glands results in eyelid diseases such as blepharitis, meibomian gland dysfunction, meibomitis, meibomian gland blockage, and the like.

Blepharitis is an inflammatory condition of the eyelid, accompanied by ulceration, itching, and pain, and aggravation thereof results in a loss of eyelashes and thickening of the eyelid. Blepharitis is called differently depending on the affected site: marginal blepharitis or anterior blepharitis occurs mainly around the root of the eyelashes; eyelid dermatitis occurs mainly on the skin of the eyelid; posterior blepharitis develops in an area closer to the conjunctiva than a line connecting the meibomian gland orifices; and angular blepharitis occurs mainly at the outer canthus. Causes of blepharitis include purulent due to an infection with bacteria or the like, atopic, and seborrheic due to oversecretion of the sebaceous glands. Steroids, antibiotics, antihistamines, and the like are used as therapeutic drugs.

Meibomian gland dysfunction refers to abnormal functioning of meibomian glands including exits of lipids. Broadly, there are two types of meibomian gland dysfunction: a decreased secretion-type in which the amount of secreted lipids decreases; and an increased secretion-type in which an excessive amount of lipids are secreted. Causes of meibomian gland dysfunction include primary such as obstructive, atrophic, congenital, and the like; and secondary such as secondary to rosacea, atopy, allergic conjunctivitis, Stevens-Johnson syndrome, graft versus host disease, trachoma, ocular infections, seborrheic dermatitis, contact lens wear, rheumatism, psoriasis, lipid metabolism disorders, cataract surgery, myopia correction surgery, and the like. Meibomian gland dysfunction has various symptoms such as congestion of the eye, foreign body sensation, sensation of dryness, burning sensation, itching, and the like. Antibiotics and the like are used as therapeutic drugs.

On the other hand, hairless mice and hairless rats, which are characterized by being devoid of hair, are used in research on pharmaceutical and cosmetic products as model animals of human skin, and a report has been made that considers the influence of giving an HR-AD diet to HR-1 hairless mice on the skin (Exp Dermatol. 2005, June, 14 (6), 460-468 (Non-Patent Document 1)). No report has heretofore been made, however, that considers an influence of restricting the intake of at least one of a lipid and a mineral by a hairless animal, on the eyelid.

CITATION LIST

Non Patent Document

NPD 1: Exp Dermatol. 2005, June, 14(6), 460-468

SUMMARY OF INVENTION

Technical Problem

Creating a therapeutic or prophylactic drug against an eyelid disease essentially requires screening using a model animal with which its therapeutic or prophylactic effect can be evaluated. However, no model animal has heretofore been available with which a therapeutic or prophylactic effect against an eyelid disease can be evaluated.

The present inventors, therefore, conducted extensive research to find a model animal and a method of screening with which an eyelid disease can be evaluated.

Solution to Problem

Consequently, the inventors surprisingly found that restricting an intake of at least one of a lipid and a mineral by a hairless animal causes at least one of plugging of meibomian gland orifices and telangiectasia around meibomian gland orifices. The inventors further found that these conditions can be improved with an existing drug. The inventors then found that a therapeutic or prophylactic effect against an eyelid disease can be evaluated by determining these conditions after administering a test substance, thus accomplishing the present invention.

That is, the present invention relates to the following.

(1) A method for changing a condition of an eyelid of a hairless animal including restricting an intake of at least one of a lipid and a mineral by the hairless animal.
(2) The method according to item (1) above, wherein a change in the condition of the eyelid is at least one of plugging of meibomian gland orifices and telangiectasia around meibomian gland orifices.
(3) The method according to item (1) above, wherein the hairless animal is a hairless mouse or a hairless rat.
(4) The method according to item (1) above, wherein the hairless animal is a Hos:HR-1 hairless mouse.
(5) The method according to item (1) above, wherein the lipid of which intake is restricted is an essential fatty acid.
(6) The method according to item (5) above, wherein the essential fatty acid of which intake is restricted is linoleic acid or α-linolenic acid.

(7) The method according to item (1) above, wherein the mineral of which intake is restricted is magnesium.

(8) The method according to item (1) above, wherein the intake of the lipid is restricted to 3 mg/kg/day or less.

(9) The method according to item (7) above, wherein the intake of magnesium is restricted to 0.15 mg/kg/day or less.

(10) The method according to item (1) above, wherein the intake of at least one of the lipid and the mineral is restricted by giving an HR-AD diet.

(11) The method according to item (1) above, wherein a period during which the intake of at least one of the lipid and the mineral is restricted is 3 days or longer.

(12) A model animal for evaluating a therapeutic or prophylactic effect against an eyelid disease obtained by the method according to any of items (1) to (11) above.

(13) The model animal according to item (12) above, wherein the eyelid disease is a disease involving at least one of plugging of meibomian gland orifices and telangiectasia around meibomian gland orifices.

(14) The model animal according to item (12) above, wherein the eyelid disease is blepharitis, marginal blepharitis, meibomian gland dysfunction, meibomitis, or meibomian gland blockage.

(15) A method for producing a model animal for evaluating a therapeutic or prophylactic effect against an eyelid disease by the method according to any of items (1) to (11) above.

(16) A method of screening for a substance having a therapeutic or prophylactic effect against an eyelid disease including administering a test substance to the model animal according to item (12) above, and determining a condition of an eyelid of the model animal.

(17) The method of screening according to item (16) above, wherein the condition of the eyelid is a condition of meibomian glands or thereabout.

(18) The method of screening according to item (17) above, wherein the condition of meibomian glands or thereabout is at least one of plugging of meibomian gland orifices and telangiectasia around meibomian gland orifices.

(19) The method of screening according to item (16) above, wherein the test substance is instilled into an eye.

(20) A substance having a therapeutic or prophylactic effect against an eyelid disease selected by the method of screening according to item (16) above.

(21) A therapeutic or prophylactic agent against an eyelid disease containing the substance according to item (20) above as an active ingredient.

It should be noted that one or more of the features according to items (1) to (21) above can be selected and combined as appropriate.

Advantageous Effects of Invention

According to the present invention, a test substance can be readily evaluated for its therapeutic or prophylactic effect against an eyelid disease.

DESCRIPTION OF EMBODIMENTS

The present invention will be hereinafter described in detail.

The method for changing a condition of an eyelid of a hairless animal according to the invention has a feature in that the condition of the eyelid of the hairless animal is changed by restricting an intake of at least one of a lipid and a mineral by the hairless animal. The "hairless animal" used in the method for changing the condition of the eyelid of the hairless animal according to the invention is a mammal (excluding a human) devoid of hair. Specific examples of such a mammal include a hairless mouse, a hairless rat, a hairless hamster, a hairless guinea pig, a hairless rabbit, and the like.

A hairless mouse and a hairless rat are preferable, and a Hos:HR-1 hairless mouse is particularly preferable. Hos:HR-1 hairless mice are produced by Hoshino Laboratory Animals, Inc. The sex, the weeks of age, and the body weight of the hairless animal are not particularly limited.

While the type of the lipid to be restricted in the present invention is not particularly limited, the lipid is preferably an essential fatty acid, and particularly preferably linoleic acid or α-linolenic acid. The intake of the fatty acid is restricted to a daily intake of 3 mg/kg or less, preferably 2 mg/kg or less, and particularly preferably 1.5 mg/kg or less. While the method of restricting the lipid is not particularly limited, preferably, a diet containing 2 mass % or less of crude lipid is fed, more preferably, a diet containing 1 mass % or less of the crude lipid is fed, and particularly preferably, an HR-AD diet is fed. The HR-AD diet is produced by Nosan Corporation.

While the type of the mineral to be restricted in the present invention is not particularly limited, magnesium is particularly preferable. The intake of the mineral is restricted to a daily intake of 0.15 mg/kg or less, preferably 0.1 mg/kg or less, and particularly preferably 0.075 mg/kg or less. While the method of restricting the mineral is not particularly limited, preferably, a diet containing 0.1 mass % or less of the mineral is fed, more preferably, a diet containing 0.05 mass % or less of the mineral is fed, and particularly preferably, the HR-AD diet is fed.

In the present invention, the restriction of the intake of at least one of the lipid and the mineral is continued for preferably 3 days or longer, more preferably 7 days or longer, and particularly preferably 14 days or longer.

The invention also provides a model animal for evaluating a therapeutic or prophylactic effect against an eyelid disease obtained by the above-described method for changing the condition of the eyelid of the hairless animal according to the invention. Furthermore, the invention provides a method for producing a model animal for evaluating a therapeutic or prophylactic effect against an eyelid disease obtained by the above-described method for changing the condition of the eyelid of the hairless animal according to the invention.

As used herein, the term "eyelid disease" refers to a disease that affects an eyelid, and is preferably a disease involving at least one of plugging of meibomian gland orifices and telangiectasia around meibomian gland orifices. Specific examples of the eyelid disease include blepharitis, marginal blepharitis, meibomian gland dysfunction, meibomitis, meibomian gland blockage, and the like.

As used herein, the term "blepharitis" is an inflammatory condition of an eyelid, and includes anterior blepharitis, marginal blepharitis, posterior blepharitis, eyelid dermatitis, angular blepharitis, and the like. Causes of blepharitis include purulent due to an infection with bacteria or the like, atopic, seborrheic, and the like.

As used herein, the term "meibomian gland dysfunction" refers to abnormal functioning of meibomian glands including exits of lipids, and includes the decreased secretion-type in which the amount of secreted lipids decreases, and the increased secretion-type in which an excessive amount of lipids are secreted. Causes of meibomian gland dysfunction include primary such as obstructive, atrophic, congenital, and the like; and secondary such as secondary to rosacea, atopy, allergic conjunctivitis, Stevens-Johnson syndrome, graft versus host disease, trachoma, ocular infections, seborrheic dermatitis, contact lens wear, rheumatism, psoriasis, lipid metabolism disorders, cataract surgery, myopia correction surgery, and the like.

As used herein, the term "meibomitis" is an inflammatory condition of meibomian glands, and the meibomian gland blockage is a condition in which a mixture of keratinized matter and lipids becomes solid within the ducts of meibomian glands.

The present invention also provides a method of screening for a substance having a therapeutic or prophylactic effect against an eyelid disease including administering a test substance to the above-described model animal according to the invention, and determining a condition of an eyelid of the model animal.

Examples of the "test substance" according to the invention include known or novel synthetic or natural compounds. Specific examples of such compounds include aromatic compounds, aliphatic compounds, cyclic or linear peptides, proteins, sugar, nucleic acids and derivatives thereof, salts thereof, and the like.

The test substance according to the invention can be orally or parenterally administered, and is particularly preferably instilled into an eye.

When the test substance is instilled into an eye, the test substance dissolved or suspended in purified water, saline, a buffer, or the like can be administered.

The test substance can also be administered by applying an ophthalmic ointment prepared using a base such as white petrolatum, liquid paraffin, or the like.

When the method of screening according to the invention is carried out, a therapeutic effect of the test substance can be evaluated by administering the test substance to a model animal obtained by restricting the intake of at least one of the lipid and the mineral, and then determining the condition of the eyelid of the model animal. On the other hand, a prophylactic effect of the test substance can be evaluated by determining the condition of the eyelid of the model animal concurrently with the production of the model animal or when the test substance has been administered before.

When the method of screening according to the invention is carried out, preferably, the condition of the eyelid of the animal to which the test substance has been administered is compared with that of an animal to which a vehicle or saline has been administered. Preferably, as a control, an animal for which the intake of at least one of the lipid and the mineral is not restricted is used. As used herein, the animal for which the intake of at least one of the lipid and the mineral is not restricted is an animal obtained by feeding a normal diet, which is, for example, a diet containing certain proportions of crude protein, crude lipid, crude ash, crude fiber, moisture, soluble nitrogen-free extract, mineral, and the like, preferably, a diet containing 3 to 7 mass % of crude lipid and 0.15 to 0.4 mass % of magnesium, and more preferably, a diet containing 4 to 6 mass % of crude lipid and 0.2 to 0.3 mass % of magnesium.

The evaluation of the therapeutic or prophylactic effect against the eyelid disease according to the invention is conducted by determining the condition of the eyelid of the model animal, preferably, by determining the condition of meibomian glands or thereabout, and more preferably, by determining at least one of plugging of meibomian gland orifices and telangiectasia around meibomian gland orifices.

In the case of the evaluation by determining plugging of meibomian gland orifices, the evaluation is preferably made by observing the meibomian gland orifices with the slitlamp or the like, and determining the number of plugged meibomian glands. As used herein, the term "plugging" or "plugged" refers to, for example, the state in which the meibomian gland orifice is opaque and swollen, or the state in which the meibomian gland orifice is clouded in a white or yellowish white color. While a screening reference is not particularly limited and can be set depending on the amount of the test substance administered, the type of the animal used, and the like, the screening reference is preferably such that the average value of the number of plugged meibomian glands for a test substance administered group is smaller than that for a vehicle or saline administered group, and more preferably, the number of plugged meibomian glands for the test substance administered group is significantly smaller than that for the vehicle or saline administered group.

In the case of the evaluation by determining telangiectasia around meibomian gland orifices, the evaluation is preferably made by observing the meibomian gland orifices with the slitlamp or the like, and determining the number of dilated capillary vessels running between meibomian gland orifices. The term dilated capillary vessels refers to, for example, capillary vessels in such a state that as a result of the expansion of vessel diameters, the capillary vessels, which are otherwise normally invisible, can be seen. While a screening reference is not particularly limited and can be set depending on the amount of the test substance administered, the type of the animal used, and the like, the screening reference is preferably such that the average value of the number of dilated capillary vessels for the test substance administered group is smaller than that for the vehicle or saline administered group, and more preferably, the number of dilated capillary vessels for the test substance administered group is significantly smaller than that for the vehicle or saline administered group.

Furthermore, the invention provides a substance having a therapeutic or prophylactic effect against an eyelid disease selected by the above-described method of screening according to the invention, and a therapeutic or prophylactic agent against an eyelid disease containing the substance as an active ingredient.

Examples

The invention will hereinafter be described in more detail with reference to the Examples, which are provided for better understanding of the invention, and should not to be construed as limiting the scope of the invention.

1. Influence of Giving HR-AD Diet on Plugging of Meibomian Gland Orifices and Capillary Vessels around Meibomian Glands (Fed Diet)

A normal diet-fed group: CRF-1 diet (produced by Oriental Yeast Co., Ltd.)

An HR-AD diet-fed group: HR-AD diet (produced by Nosan Corporation)

(Experimental Method)

Five-week-old male Hos:HR-1 hairless mice were divided into the normal diet-fed group and the HR-AD diet-fed group (6 mice for each group), and the respective groups were fed and voluntarily ingested the normal diet and the HR-AD diet. On day 14, day 28, and day 42 after the beginning of feeding, the meibomian gland orifices and thereabout were observed with the slitlamp, and the number of plugged orifices among eight meibomian gland orifices at the center of an upper eyelid was counted. In this experiment, the state in which a meibomian gland orifice was opaque and swollen was identified as the "plugged" condition. Moreover, the number of dilated capillary vessels running between orifices of meibomian glands of the upper eyelid was counted. As used herein, the term "dilated capillary vessels" refers to capillary vessels in such a state that as a result of the expansion of vessel diameters, the capillary vessels, which are otherwise normally invisible, can be seen.

(Results and Discussion)

Table 1 shows the results of the number of plugged meibomian gland orifices, and Table 2 shows the results of the number of dilated capillary vessels.

TABLE 1

|  | Normal Diet-Fed Group (Average Value) | HR-AD Diet-Fed Group (Average Value) |
|---|---|---|
| Day 14 | 2.2 | 4.0 |
| Day 28 | 1.5 | 4.8 |
| Day 42 | 2.0 | 5.8 |

TABLE 2

|  | Normal Diet-Fed Group (Average Value) | HR-AD Diet-Fed Group (Average Value) |
|---|---|---|
| Day 14 | 1.0 | 4.3 |
| Day 28 | 1.5 | 4.3 |
| Day 42 | 1.7 | 5.8 |

On each of day 14, day 28, and day 42 after the beginning of feeding the HR-AD diet, an increase in the number of plugged meibomian gland orifices and an increase in the number of dilated capillary vessels were observed in the HR-AD diet-fed group, as compared to the normal diet-fed group.

2. Examination of Effect of Therapeutic Drug (Fed Diet)

A normal diet-fed group: CRF-1 diet (produced by Oriental Yeast Co., Ltd.)

An HR-AD diet-fed group: HR-AD diet (produced by Nosan Corporation)

(Experimental Method)

Six-week-old male Hos:HR-1 hairless mice were divided into the normal diet-fed group (6 mice) and the HR-AD diet-fed group (12 mice), and the respective groups were fed and voluntarily ingested the normal diet and the HR-AD diet. On day 28 after the beginning of feeding, the meibomian gland orifices in the HR-AD diet-fed group were observed with the slitlamp, and the HR-AD diet-fed group was divided into a saline administered group and an AzaSite® ophthalmic solution (1% azithromycin) administered group (six mice for each group), so as to reduce variations in the average value of the number of plugged meibomian gland orifices. From day 29 after the beginning of feeding, saline or AzaSite® ophthalmic solution was instilled into eyes for 28 days (2 µL/eye; twice a day on day 1 and day 2 from the beginning of instillation, and once a day on day 3 and thereafter). On day 42 and day 56 after the beginning of feeding, the meibomian gland orifices were observed with the slitlamp, and the number of plugged orifices among eight meibomian gland orifices at the center of an upper eyelid was counted.

(Results and Discussion)

The results are shown in Table 3.

TABLE 3

|  | Saline Administered Group (Average Value) | AzaSite ® Ophthalmic Solution Administered Group (Average Value) |
|---|---|---|
| Day 28 | 5.5 | 5.2 |
| Day 42 | 5.8 | 3.7 |
| Day 56 | 6.3 | 1.8 |

It was revealed that in the AzaSite® ophthalmic solution administered group, the number of plugged meibomian gland orifices was clearly reduced as compared to that in the saline administered group, showing that the test system according to the invention enables evaluation of drug efficacy.

INDUSTRIAL APPLICABILITY

According to the invention, a test substance can be readily evaluated for its therapeutic or prophylactic effect against an eyelid disease, and a therapeutic or prophylactic drug against an eyelid disease can be efficiently created.

The invention claimed is:

1. A method of screening for a substance having a therapeutic effect in an eyelid disease involving meibomian gland blockage, comprising administering a test substance to a model animal having meibomian gland blockage, and determining the effect of the administered test substance on the meibomian gland blockage in the model animal, wherein the model animal is obtained by a method comprising feeding an HR-AD diet to a Hos: HR-1 hairless mouse until meibomian gland blockage is formed in the Hos: HR-1 hairless mouse.

2. The method of screening according to claim 1, wherein the HR-AD diet is given to the hairless animal for 3 days or longer.

3. The method of screening according to claim 1, wherein the test substance is instilled into an eye.

4. The method according to claim 1, further comprising feeding an HR-AD diet to a Hos: HR-1 hairless mouse until meibomian gland blockage is formed in the Hos: HR-1 hairless mouse, whereby the model animal is obtained.

* * * * *